United States Patent

Brown et al.

Patent Number: 6,036,226
Date of Patent: Mar. 14, 2000

[54] INFLATOR CAPABLE OF MODULATION AIR BAG INFLATION RATE IN A VEHICLE OCCUPANT RESTRAINT APPARATUS

[75] Inventors: Steven Joseph Brown, Pittsfield, Mass.; Larry Stefan Ingram, Lawrenceville, N.J.; Neale Arthur Messina, Philadelphia, Pa.; Marek Tarczynski, Princeton, N.J.

[73] Assignee: General Dynamics Armament Systems, Inc., Falls Church, Va.

[21] Appl. No.: 08/995,419

[22] Filed: Dec. 19, 1997

Related U.S. Application Data

[60] Provisional application No. 60/037,234, Feb. 3, 1997.

[51] Int. Cl.⁷ .................................................. B60R 21/26
[52] U.S. Cl. ........................... 280/736; 280/742; 280/741
[58] Field of Search ................................... 280/741, 737, 280/742, 736

[56] References Cited

U.S. PATENT DOCUMENTS

| | | |
|---|---|---|
| 4,341,147 | 7/1982 | Mayer .......................................... 89/7 |
| 4,523,507 | 6/1985 | Magoon ....................................... 89/7 |
| 4,523,508 | 6/1985 | Mayer et al. ................................. 89/7 |
| 4,693,165 | 9/1987 | Magoon et al. .............................. 89/7 |
| 4,745,841 | 5/1988 | Magoon et al. .............................. 89/7 |
| 4,907,486 | 3/1990 | Mayer .......................................... 89/7 |
| 5,060,973 | 10/1991 | Giovanetti . |
| 5,284,330 | 2/1994 | Carlson et al. . |
| 5,414,845 | 5/1995 | Brede et al. . |
| 5,487,561 | 1/1996 | Mandzy et al. . |
| 5,639,117 | 6/1997 | Mandzy et al. ......................... 280/741 |
| 5,669,631 | 9/1997 | Johnson et al. . |
| 5,683,104 | 11/1997 | Smith ..................................... 280/736 |
| 5,695,216 | 12/1997 | Sandstrom et al. . |
| 5,713,596 | 2/1998 | Messina et al. .......................... 280/37 |
| 5,719,351 | 2/1998 | Johnson et al. . |
| 5,806,884 | 9/1998 | Johnson et al. ......................... 280/736 |
| 5,829,784 | 11/1998 | Brown et al. ............................ 280/737 |
| 5,857,699 | 1/1999 | Rink et al. .............................. 280/737 |
| 5,907,120 | 5/1999 | Mooney et al. ......................... 102/521 |
| 5,927,753 | 7/1999 | Faigle et al. ............................ 280/735 |
| 5,941,040 | 9/1999 | McFarland et al. ..................... 280/736 |
| 5,947,514 | 9/1999 | Keller et al. ............................ 280/742 |
| 5,967,550 | 10/1999 | Shirk et al. ............................. 280/736 |
| 5,970,880 | 10/1999 | Perotto .................................. 102/531 |

OTHER PUBLICATIONS

Article entitled *faults and failures*, IEEE Spectrum Magazine, p. 17, May 1997.

*Primary Examiner*—Lanna Mai
*Assistant Examiner*—Andrew J. Ririe
*Attorney, Agent, or Firm*—Finnegan, Henderson, Farabow, Garrett & Dunner

[57] ABSTRACT

In an occupant restraint apparatus for installation in a vehicle, a smart airbag inflator is provided with a piston for regeneratively pumping liquid propellant from a reservoir into a combustion chamber for ignition and combustion to generate airbag inflation gases. To control the airbag inflation rate, the piston includes a piston head slidingly received in a damping chamber filled with a magneto-rheological fluid that is pumped through an orifice during the regenerative pumping stroke of the piston. An electromagnet is selectively energized to produce a varying magnetic field to adjust the viscosity of the magneto-rheological fluid flowing through the orifice and thus vary a damping force exerted on the piston stroke, thereby modulating the rate of liquid propellant combustion. Electromagnet current excitation is controlled in response to a particular accident scenario.

38 Claims, 2 Drawing Sheets

INFLATOR CAPABLE OF MODULATION AIR BAG INFLATION RATE IN A VEHICLE OCCUPANT RESTRAINT APPARATUS

This application claims benefit under 35 U.S.C. § 119(e) of U.S. provisional application No. 60/037,234, filed Feb. 3, 1997.

BACKGROUND OF THE INVENTION

1. Field of the Invention

The present invention relates to vehicle occupant restraints and more particularly to a "smart" airbag apparatus capable of modulating inflation characteristics in response to collision and occupant parameters.

2. Description of the Related Art

Many vehicles on the road today include airbags installed in steering wheels, dashboards, and more recently, doors. These airbags are designed to protect a vehicle occupant against both front and side impact collisions by rapidly inflating the airbag to absorb much of the collision energy that would otherwise be transferred to the occupant.

Such conventional airbags are inflated based on a single threshold test: if a predetermined vehicle deceleration occurs in a collision, airbag inflation is triggered. Thereafter, airbag deployment occurs at a predetermined inflation rate. Both the triggering threshold and the inflation rate are not modified based on the type of vehicle collision, or the many different occupant variables, such as occupant weight, occupant position at the moment of impact, etc.

This inability to modulate inflation characteristics has resulted in serious injuries, even deaths, because of the existence of airbags in the vehicles had not been equipped with. This is because the explosive force of inflating airbags impacting occupants, particularly infants, the elderly, and those not wearing seat belts, can be more harmful than the accidents would otherwise have been.

Therefore, a need exists for a "smart" airbag apparatus which provides modulated airbag deployment based upon dynamics of the collision and occupant parameters.

SUMMARY OF THE INVENTION

An objective of the invention is to provide a vehicle occupant restraint apparatus capable of modulated airbag deployment.

Additional objectives and advantages of the invention will be set forth in part in the description which follows, and in part will be obvious from the following description, or may be learned by practice of the invention.

In accordance with the objectives and purpose of the present invention, as embodied and broadly described herein, the invention comprises an occupant restraint apparatus for installation in a vehicle. The apparatus includes an airbag and an inflator. The inflator includes a combustion chamber in fluid communication with the airbag, a reservoir containing a liquid propellant, a port fluidically interconnecting the combustion chamber and the liquid propellant reservoir, an inflation initiator operable, in response to an accident involving the vehicle, to pressurize the liquid propellant reservoir, such that the liquid propellant is injected through the port into the combustion chamber for ignition and generation of combustion gases to inflate the airbag. The apparatus further includes a sensor for generating a signal indicative of an accident parameter, and a controller for varying a combustion rate of the liquid propellant in the combustion chamber in accordance with the sensor signal, thereby modulating an inflation rate of the airbag.

In accordance with another aspect, the present invention comprises an airbag inflator including a housing, a combustion chamber provided in the housing, a reservoir provided in the housing for containing a liquid propellant, a piston slidingly received in the housing and having a first piston head separating the combustion chamber from the liquid propellant reservoir, an injection port, and a pyrotechnic initiator. The pyrotechnic initiator is detonated in response to a vehicle accident to pressurize the combustion chamber and to ignite liquid propellant injected into the combustion chamber from the reservoir through the injection port during a regenerative pumping stroke of the piston, where combustion of the injected liquid propellant occurs to produce airbag inflation gasses. The airbag inflator further includes a controller operable to vary a rate of the piston's regenerative pumping stroke according to at least one accident parameter, thereby modulating a rate of airbag inflation during airbag deployment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principals of the invention. In the drawings.

DESCRIPTION OF THE PREFERRED EMBODIMENT

Figure 1:
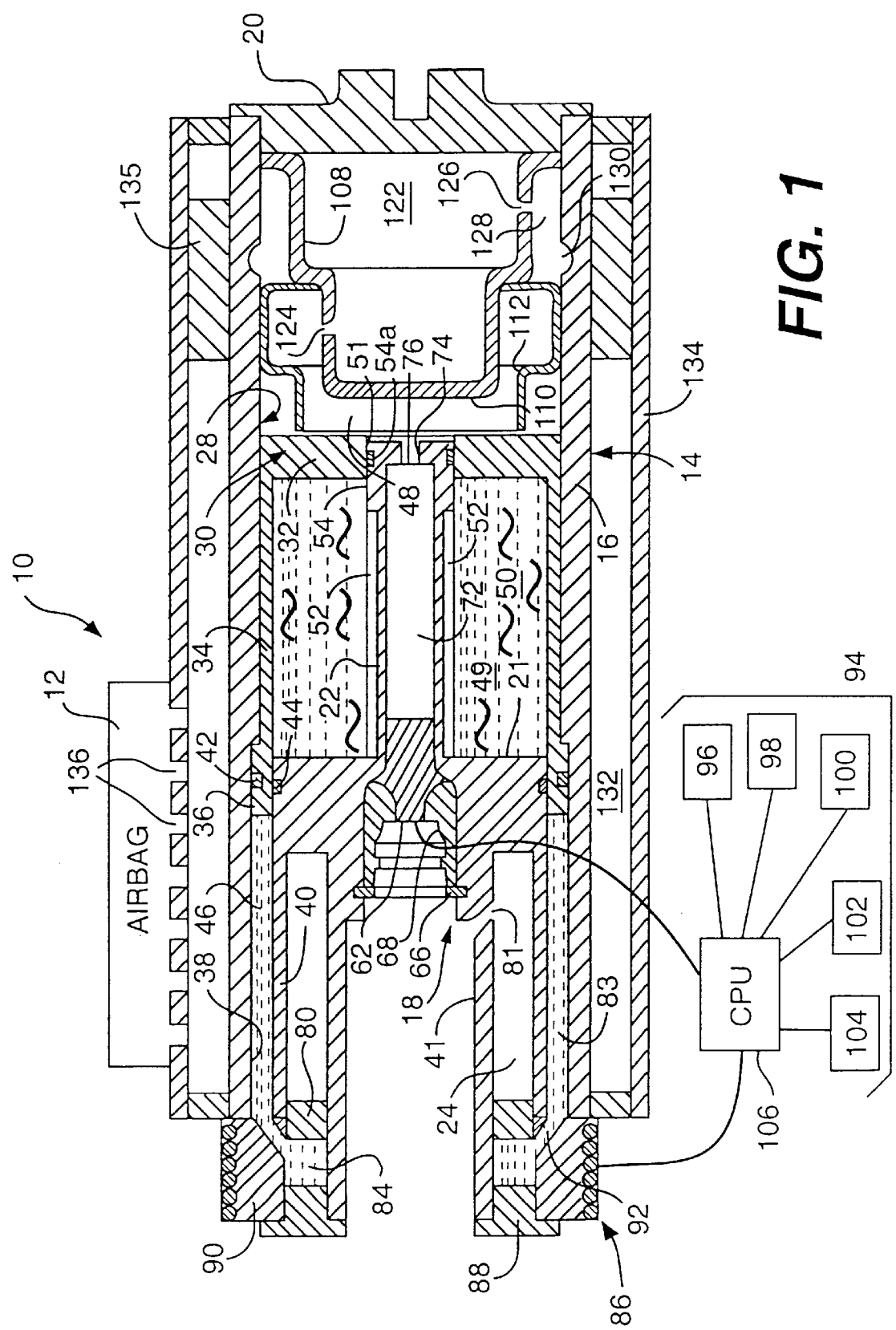
FIG. 1 is a sectional view of a "smart" airbag inflator, partially in block diagram form, configured in accordance with a presently preferred embodiment of the present invention.

In accordance with the present invention, and as embodied herein, an airbag apparatus, generally indicated at 10, comprises an inflator, generally indicated at 14, for inflating an airbag 12 in response to a vehicle accident. Inflator 14 includes a cylindrical housing 16 closed off at its left end by a rear closure, generally indicated at 18, and at its right end by a front endwall 20. The rear closure 18 includes an annular wall 21 integrally formed with a forwardly extending tube 22, and a rearwardly extending annular chamber 24. The rear closure 18 and front endwall 20 are fixed in place by suitable means, such as welded joints, to prevent fluid leakage.

The cylindrical housing 16 is machined to provide a stepped bore for receiving a piston, generally indicated at 30, which includes a radial piston head 32 and a rearwardly extending skirt 34 slidingly received in housing bore 28. The piston skirt 34 is terminated in an annular piston head 36 that is slidingly received between housing bore 38 and an outer cylindrical wall 40 of rear closure 18. This annular piston head 36 operates in an annular chamber 46 and is sealed against fluid leakage by suitable means, such as O-rings 42, 44.

Radial piston head 32 divides the interior portion of cylindrical housing 16 defined by bore 28 into a combustion chamber 48 and an annular reservoir 49 containing liquid propellant 50. As disclosed in U.S. Pat. No. 5,060,973 to Giovanetti and U.S. Pat. No. 5,487,561 to Mandzy et al., which are herein incorporated by reference, the liquid propellant may be a hydroxyl ammonium nitrate-based liquid monopropellant. A particular suitable propellant composition comprises, by mass, approximately 60% hydroxyl ammonium nitrate (HAN) as an oxidizer, 20% triethyl ammonium nitrate (TEAN) as a fuel, and 20% water as a diluent.

Figure 2:
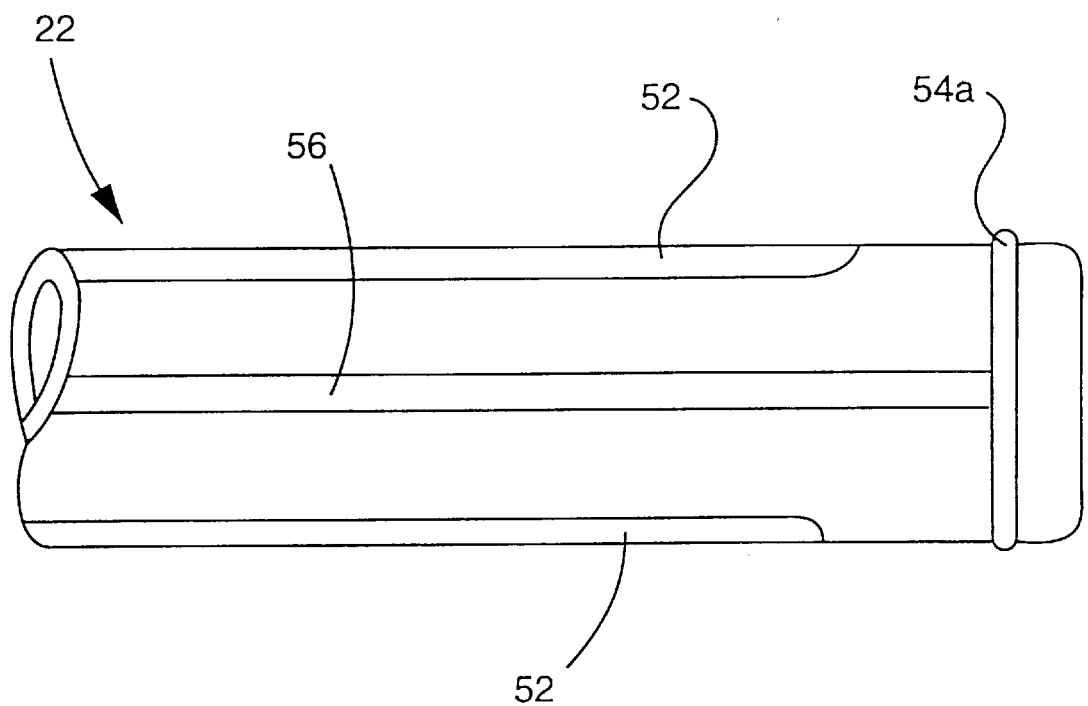
FIG. 2 is a side view of an injection port tube member utilized in the embodiment of FIG. 1.

A central injection port 51, drilled axially through the piston head 32, is normally closed by a terminal portion 54 of tube 22, which serves as a needle valve element. Thus, terminal portion 54 is slidingly received in injection port 51 and is machined with an annular groove accommodating an O-ring 54a, to provide a fluid seal with the injection port sidewall. As seen in FIG. 2, at least a pair of diametrically opposed, longitudinal grooves 52 are cut in the peripheral surface of tube 22, beginning an appropriate distance rearwardly of injection port 51 and extending back to annular wall 21. Also as seen in FIG. 2, at least one additional longitudinal groove 56 is cut in the tube peripheral surface, beginning at O-ring 54a and extending rearwardly to annular wall 21.

Seated in the shouldered central opening of annular wall 21 is a squib 62, which is held in place by a snap ring retainer 66 and annular plug 68. The interior of tube 22 forwardly of squib 62 stores a solid propellant booster charge 72. This booster charge 72 may be boron potassium nitrate, which is ignited by electrically initiated detonation of the squib 62. The byproducts of the booster charge combustion exit tube 22 through an opening 74 in terminal portion 54, which is normally closed by a frangible seal 76.

When squib 62 is fired to ignite the booster charger 72, seal 76 is ruptured, and combustion gases flow into combustion chamber 48, which is then pressurized. To permit initial rearward movement of piston 30 sufficient to open the forward end of groove 56 to the combustion chamber 48, an appropriate volume of a compressible fluid, such as air, is included in liquid propellant reservoir 49. The communication then created between liquid propellant reservoir 49 and the combustion chamber 48 through groove 56 allows liquid propellant 50 to flow into the combustion chamber 48 for combustion. Due to the differences in the surface areas of the piston head 32 facing the reservoir 49 and the piston head surface facing the combustion chamber 48 resulting from the presence of the cylindrical skirt 34, the fluid pressure in the reservoir 49 always exceeds the fluid pressure in the combustion chamber 48. Consequently, regenerative pumping of the liquid propellant from the reservoir 49 into the combustion chamber 48 is achieved. As piston 30 progresses through its rearward stroke, grooves 52 open into combustion chamber 48, thereby increasing the opening area of injection port 51, and the injection rate of liquid propellant into the combustion chamber 48 increases accordingly. Liquid propellant injection into the combustion chamber 48 by regenerative pumping and its combustion continues until piston head 32 bottoms out against annular wall 21, at which point the entire volume of liquid propellant has been pumped from reservoir 49 into the combustion chamber 48 and combusted to complete airbag deployment.

Chamber 24 provided between outer cylindrical wall 40 and inner cylindrical wall 41 of closure 18 slidingly receives an annular piston 80. The forward end of chamber 24 is vented to the atmosphere, as indicated at 81. Inner cylinder wall 41 of closure 18 extends rearwardly to mount a collar 88, which, in turn, mounts an annular electromagnet 86. Field piece 90 of this electromagnet, together with collar 88, inner cylindrical wall 41, and piston 80, define an annular chamber 84, which communicates with annular chamber 46 through a plurality of orifices or a single annular orifice indicated at 92.

In accordance with a feature of the present invention, chambers 46 and 84 are filled with a variable viscosity damper fluid, such as a magneto-rheological fluid 83. Magneto-rheological fluids, such as carbonyl iron particles suspended in silicone oil, as disclosed in U.S. Pat. No. 5,284,330 to Carlson et al., have a unique property in that viscosity can be controlled by a magnetic field.

As can be seen in FIG. 1, as piston 30 strokes rearwardly to pump liquid propellant 50 into combustion chamber 48 for combustion, piston head 36 is driven rearwardly through chamber 46. Magneto-rheological fluid 83 is thus forced to flow through orifices 92 from chamber 46 into chamber 84, and piston 80 is driven forwardly through chamber 24, which serves as a containment reservoir for the fluid 83. By controlling the viscosity of fluid 83 and thus its rate of flow through orifices 92 using a controllable magnetic field produced by electromagnet 86, a variable retarding force can be exerted on the rearward stroke of piston 30. Since the rate of rearward stroke of piston 30 governs the liquid propellant combustion rate, and, in turn, airbag inflation rate, the magnitude of the magnetic field produced by electromagnet 86 can be advantageously utilized to control airbag inflation rate on a real time basis. Thus, if no current is applied to electromagnet 86, the viscosity of damper fluid 83 is at its lowest value and the airbag inflation is at a maximum rate. When current is applied to the electromagnet 86 to produce a high magnetic field, piston stroke can be dramatically retarded to produce a gentle airbag deployment. In fact, a magnetic field of maximum magnitude can actually stop the flow of damper fluid through orifices 92, which will arrest the rearward stroke of piston 30 and thus stop further airbag inflation. Between no magnetic field and maximum magnetic field are an infinite number of airbag inflation profiles that can be produced by real time variations of the magnetic field during an inflation period.

Further in accordance with the present invention, the magnetic field produced by electromagnet 86 is varied in response to signals produced by a sensor suite 94, including, for example, a crash severity sensor 96, a rear-facing infant seat sensor 98, an occupant weight sensor 100, a dashboard proximity sensor 102, and a seat belt sensor 104, etc. A central processing unit 106 processes the sensor outputs according to an appropriate algorithm, such as to modulate the airbag inflation rate during deployment according to a particular scenario of collision and occupant parameters.

Completing the description of inflator 10, a generally cup-shaped partition 108 is inserted into housing 16 in press-fit relation, with its open end closed by front endwall 20 and its closed end portion defining a forward boundary 110 for combustion chamber 48. A convoluted sleeve 112 serves to retain the position of partition 108 in the manner described in commonly assigned, U.S. Pat. No. 5,829,784, the disclosure of which is incorporated herein by reference.

The interior of cup-shaped partition 108 provides a swirl chamber 122 in fluid communication with combustion chamber 48 through a plurality of equiangularly spaced swirl ports 124 in partition wall section 110. The term "swirl" is intended to characterize ports 124 as being configured to achieve a circular or swirling flow of fluid (combustion gases) in chamber 122 upon entry from combustion chamber 48. For this purpose, ports 124 may be drilled through partition wall section 110 at an oblique angle such that gases enter chamber 122 closely tangential to the inner cylindrical surface of the partition wall section 110.

The benefits achieved by utilization of swirl ports 124 are discussed in the cited application Ser. No. 08/800,189.

From swirl chamber 122, gas flow is through equiangularly spaced swirl ports 126 in partition wall section 108 into an annular chamber 128. Swirl ports 130 in cylindrical wall 16 permit gas flow from annular chamber 128 into an annular plenum chamber 132 provided between an outer cylindrical shell 134 and cylindrical wall 16. Preferably, a ring 135 of porous media of suitable heat exchanging material, such as braided steel mesh screens, is positioned in plenum chamber 132, which the gases flow through and are cooled en route to a plurality of vent holes 136 in shell 134 leading to the airbag 12.

It will be apparent to those skilled in the art that various modifications and variations may be made to the vehicle occupant restraint apparatus of the present invention without departing from the spirt of the invention. For example, the damper fluid may comprise an electro-rheological fluid whose viscosity is controlled by an electric field to vary flow rate through orifice 92 and thus the damping force exerted against the rearward stroke of regenerative pumping piston 30. It will also occur to those skilled in the art that, rather than a rheological hydraulic fluid, the desired modulated damping of the piston's regenerative pumping stroke could be achieved by varying the opening area of orifice 92, such as to vary the flow rate of a conventional hydraulic damping fluid through the orifice. Thus, it is intended that the scope of the present invention cover modifications and variations thereof, provided they come within the spirt of the appended claims and thus equivalents.

We claim:

1. An occupant restraint apparatus for installation in a vehicle, comprising:
    an airbag; and
    an inflator including:
        a combustion chamber in fluid communication with the airbag;
        a reservoir containing a liquid propellant;
        a port fluidically interconnecting the combustion chamber and the liquid propellant reservoir;
        an inflation initiator operable, in response to an accident involving the vehicle, to pressurize the liquid propellant reservoir, such that the liquid propellant is injected through the port into the combustion chamber for ignition and generation of combustion gases to inflate the airbag;
        a sensor for generating a signal indicative of an accident parameter; and
        an inflation rate modulator controlling the inflation initiator and, thereafter, varying a combustion rate of the liquid propellant in the combustion chamber in accordance with the sensor signal, thereby regulating an inflation rate of the airbag.

2. The apparatus of claim 1, further comprising a piston separating the combustion chamber and the reservoir, the piston executing a pumping stroke to inject the liquid propellant through the port into the combustion chamber, the inflation rate modulator acting to vary a pumping stroke rate of the piston that determines the combustion rate.

3. The apparatus of claim 2, further comprising a damping chamber containing a hydraulic fluid for developing a damping force retarding the piston pumping stroke, the inflation rate modulator acting to vary the damping force.

4. The apparatus of claim 3, wherein the hydraulic fluid is a rheological fluid and the inflation rate modulator acts to vary a viscosity of the rheological fluid.

5. The apparatus of claim 4, wherein the damping chamber includes an orifice through which the rheological fluid is pumped by the piston pumping stroke at a rate determined by the rheological fluid viscosity.

6. The apparatus of claim 5, wherein the rheological fluid is a magneto-rheological fluid, and the inflation rate modulator further comprises an electromagnet for producing a magnetic field proximate the orifice to control the viscosity of the magneto-rheological fluid according to electromagnet current excitation by the inflation rate modulator.

7. The apparatus of claim 6, wherein the sensor includes a plurality of sensors for producing signals respectively indicative of occupant and collision parameters, and the inflation rate modulator includes a central processing unit programmed to process the sensor signals, such as to determine a modulation of electromagnet current excitation during inflation of the airbag.

8. The apparatus of claim 6, wherein the piston includes a first piston head separating the liquid propellant reservoir and the combustion chamber and a second piston head acting on the magneto-rheological fluid in the damping chamber.

9. The apparatus of claim 8, wherein the injection port is defined in part by a hole through the first piston head.

10. The apparatus of claim 9, wherein the injection port is further defined by a forwardly extending needle valve element projecting through the hole to control an opening area of the injection port.

11. The apparatus of claim 10, wherein the needle valve element includes a terminal portion disposed in fluid-sealing relation with the hole before operation of the inflation initiator.

12. The apparatus of claim 11, wherein the needle valve element includes angularly spaced, longitudinally extending, peripheral surface grooves defining a differential opening area of the injection port during the pumping stroke of the piston.

13. The apparatus of claim 11, wherein the needle valve element is of a tubular shape to accommodate a squib at a rearward end and a forwardly extending cavity accommodating a booster charge of the inflation initiator, the terminal portion of the needle valve element including a frangibly sealed opening into the combustion chamber.

14. An airbag inflator comprising:
    a housing;
    a combustion chamber provided in the housing;
    a reservoir provided in the housing for containing a liquid propellant;
    a piston slidingly received in the housing and having a first piston head separating the combustion chamber from the liquid propellant reservoir;
    an injection port;
    a pyrotechnic initiator, detonated in response to a vehicle accident, to pressurize the combustion chamber and to ignite liquid propellant injected into the combustion chamber from the reservoir through the injection port during a regenerative pumping stroke of the piston, combustion of the injected liquid propellant producing airbag inflation gasses; and
    a controller varying a rate of the piston's regenerative pumping stroke according to at least one accident parameter, thereby regulating a rate of airbag inflation during airbag deployment.

15. The airbag inflator of claim 14, wherein the controller includes a hydraulic damper for exerting a variable retarding force on the piston's regenerative pumping stroke.

16. The airbag inflator of claim 15, wherein the hydraulic damper includes a damping chamber containing a hydraulic fluid, and the piston includes a second piston head slidingly received in the damping chamber.

17. The airbag inflator of claim 16, wherein the damping chamber further includes an orifice through which the hydraulic fluid is expelled by the second piston head during the piston's regenerative pumping stroke, the controller acting to adjustably control a rate of hydraulic fluid flow through the orifice.

18. The airbag inflator of claim 17, wherein the hydraulic fluid is a rheological fluid.

19. The airbag inflator of claim 18, wherein the hydraulic fluid is a magneto-rheological fluid, and the controller further includes an electromagnet for generating a magnetic field to vary a viscosity of the magneto-rheological fluid flowing through the orifice.

20. The airbag inflator of claim 19, wherein the controller further includes;
   a plurality of sensors for generating signals respectively indicative of occupant and collision parameters, and
   a central processing unit for processing the sensor signals to variably modulate current excitation of the electromagnet.

21. The airbag inflator of claim 19, further including a containment chamber for recovering the magneto-rheologically fluid expelled through the orifice.

22. The airbag inflator of claim 21, wherein the damping and containment chambers are concentrically arranged in the housing, and the second piston head is of an annular configuration and connected to the first piston head by a cylindrical skirt.

23. The airbag inflator of claim 22, wherein the containment chamber includes a vent open to atmospheric pressure, and an annular piston slidingly received in the containment chamber between the orifice and the vent.

24. The apparatus of claim 17, wherein the injection port is defined in part by a hole through the first piston head.

25. The apparatus of claim 24, wherein the injection port is further defined by a forwardly extending needle valve element projecting through the hole to control an opening area of the injection port.

26. The apparatus of claim 25, wherein the needle valve element includes a terminal portion disposed in fluid-sealing relation with the hole prior to detonation of the pyrotechnic initiator.

27. The apparatus of claim 26, wherein the needle valve element includes angularly spaced, longitudinally extending, peripheral surface grooves defining a differential opening area of the injection port during the regenerative pumping stroke of the piston.

28. The apparatus of claim 27, wherein the needle valve element is of a tubular shape accommodating a squib at a rearward end and a forwardly extending cavity accommodating a booster charge of the pyrotechnic initiator, the terminal portion of the needle valve element including an opening from the booster charge cavity into the combustion chamber, the opening normally closed by a frangible seal.

29. The airbag inflator of claim 28, wherein the hydraulic fluid is a rheological fluid.

30. The airbag inflator of claim 29, wherein the hydraulic fluid is a magneto-rheological fluid, and the controller further includes an electromagnet for generating a magnetic field to vary a viscosity of the magneto-rheological fluid flowing through the orifice.

31. The airbag inflator of claim 30, wherein the controller further includes;
   a plurality of sensors for generating signals respectively indicative of occupant and collision parameters, and
   a central processing unit for processing the sensor signals to variably modulate current excitation of the electromagnet.

32. An airbag inflator comprising:
   a housing;
   a combustion chamber provided in the housing;
   a reservoir provided in the housing for containing combustible fluid;
   a piston slidingly received in the housing and having a first piston head separating the combustion chamber from the combustible fluid reservoir;
   an injection port;
   a initiator, activated in response to a vehicle accident, to pressurize the combustion chamber and to ignite combustible fluid injected into the combustion chamber from the reservoir through the injection port during a regenerative pumping stroke of the piston, combustion of the injected combustible fluid producing airbag inflation gasses; and
   a controller including at least one sensor, the controller varying a rate of the piston's regenerative pumping stroke according to at least one accident parameter, thereby regulating a rate of airbag inflation during airbag deployment.

33. The airbag inflator of claim 32, wherein the controller further includes a hydraulic damper for exerting a variable retarding force on the piston's regenerative pumping stroke.

34. The airbag inflator of claim 33, wherein the hydraulic damper further includes a damping chamber containing hydraulic fluid, and the piston includes a second piston head slidingly received in the damping chamber.

35. The airbag inflator of claim 34, wherein the damping chamber further includes an orifice through which the hydraulic fluid is expelled by the second piston head during the piston's regenerative pumping stroke, the controller acting to adjustably control a rate of hydraulic fluid flow through the orifice.

36. The airbag inflator of claim 35, wherein the hydraulic fluid is a rheological fluid.

37. The airbag inflator of claim 36, wherein the hydraulic fluid is a magneto-rheological fluid, and the controller further includes an electromagnet for generating a magnetic field to vary viscosity of the magneto-rheological fluid flowing through the orifice.

38. The airbag inflator of claim 37, wherein the controller further includes;
   a plurality of sensors for generating signals respectively indicative of occupant and collision parameters, and
   a central processing unit for processing the sensor signals to variably modulate current excitation of the electromagnet.

* * * * *